(12) United States Patent
Schadhauser

(10) Patent No.: US 11,123,906 B2
(45) Date of Patent: Sep. 21, 2021

(54) INJECTION MOULDING MACHINE FOR PRODUCING FIBRE-REINFORCED PLASTIC MOULDINGS

(71) Applicant: KRAUSSMAFFEI TECHNOLOGIES GMBH, Munich (DE)

(72) Inventor: Maximilian Schadhauser, Munich (DE)

(73) Assignee: KRAUSSMAFFEI TECHNOLOGIES GMBH, Munich (DE)

(*) Notice: Subject to any disclaimer, the term of this patent is extended or adjusted under 35 U.S.C. 154(b) by 295 days.

(21) Appl. No.: 16/334,477

(22) PCT Filed: Jul. 18, 2017

(86) PCT No.: PCT/EP2017/068074
§ 371 (c)(1),
(2) Date: Mar. 19, 2019

(87) PCT Pub. No.: WO2018/068913
PCT Pub. Date: Apr. 19, 2018

(65) Prior Publication Data
US 2019/0232536 A1    Aug. 1, 2019

(30) Foreign Application Priority Data
Oct. 10, 2016    (DE) .................... 10 2016 119 172.8

(51) Int. Cl.
*B29C 45/60*    (2006.01)
*B29C 45/00*    (2006.01)
(Continued)

(52) U.S. Cl.
CPC ...... *B29C 45/0005* (2013.01); *B29C 45/1816* (2013.01); *B29C 45/52* (2013.01); *B29C 2045/528* (2013.01); *B29K 2105/06* (2013.01); *B29K 2105/08* (2013.01)

(58) Field of Classification Search
CPC ....... B29C 45/50; B29C 45/60; B29C 45/005; B29C 45/20; B29C 45/23; B29C 45/231; B29C 2045/1816; B29C 2045/528
See application file for complete search history.

(56) References Cited

U.S. PATENT DOCUMENTS 3,486,194 A    12/1969  Parks
3,590,439 A *   7/1971  Swanson
(Continued)

FOREIGN PATENT DOCUMENTS

DE    2516376 A1    10/1975
DE    2541738 B2    6/1978
(Continued)

OTHER PUBLICATIONS

Office action for JP 2019-517301 dated Feb. 10, 2021 and translation thereof.
(Continued)

*Primary Examiner* — Joseph S Del Sole
*Assistant Examiner* — Thu Khanh T Nguyen
(74) *Attorney, Agent, or Firm* — Pearne & Gordon LLP

(57) ABSTRACT

An injection moulding machine for producing fibre-reinforced plastic mouldings, having a closing unit and an injection unit, wherein the injection unit has a cylinder and a screw that can be rotated and displaced in the longitudinal direction in the cylinder, the screw having a backflow stop. In the cylinder, filling openings are provided for feeding in a plastic material to be melted and fibre material. To reduce fibre breakage and ensure good mixing, according to the invention a mixing part is provided downstream and/or upstream of the backflow stop, the mixing part being connected to the screw in a rotationally fixed manner for conjoint rotation therewith and having a cylindrical main body with drop-shaped mixing elements arranged thereon.

19 Claims, 5 Drawing Sheets

(51) Int. Cl.
  *B29C 45/18* (2006.01)
  *B29C 45/52* (2006.01)
  *B29K 105/08* (2006.01)
  *B29K 105/06* (2006.01)

(56) References Cited

U.S. PATENT DOCUMENTS

| | | |
|---|---|---|
| 6,136,246 A | 10/2000 | Rauwendaal et al. |
| 2004/0012107 A1 | 1/2004 | Xu et al. |
| 2013/0200552 A1 | 8/2013 | Kariya et al. |
| 2015/0239158 A1 | 8/2015 | Heidemeyer et al. |
| 2017/0355119 A1* | 12/2017 | Nobuta et al. |

FOREIGN PATENT DOCUMENTS

| | | |
|---|---|---|
| DE | 31 47 723 A1 | 9/1982 |
| DE | 38 05 849 A1 | 9/1989 |
| DE | 4236662 C2 | 10/1996 |
| DE | 102009056653 A1 | 6/2011 |
| JP | S49-031976 U | 3/1974 |
| JP | S50-161552 A | 12/1975 |
| JP | S57-24021 U | 2/1982 |
| JP | 2013-086455 A | 5/2013 |
| KR | 100 758 479 B1 | 9/2007 |
| WO | 00/44548 A1 | 8/2000 |
| WO | 2012056565 A1 | 5/2012 |
| WO | 2014/048666 A1 | 4/2014 |

OTHER PUBLICATIONS

International Search Report for International Application No. PCT/EP2017/068074, dated Oct. 18, 2017.
International Preliminary Report on Patentability for International Application No. PCT/EP2017/068074, dated Oct. 19, 2018.

* cited by examiner

INJECTION MOULDING MACHINE FOR PRODUCING FIBRE-REINFORCED PLASTIC MOULDINGS

CROSS-REFERENCE TO RELATED APPLICATIONS

This is a National Stage application of PCT international application PCT/EP2017/068074, filed on Jul. 18, 2017, which claims the priority of German Patent Application No. 10 2016 119 172.8, filed Oct. 10, 2016, both of which are incorporated herein by reference in their entireties.

FIELD OF THE INVENTION

The invention relates to an injection molding machine according to the preamble of claim 1.

BACKGROUND OF THE INVENTION

Known from prior art are generic injection molding machines for producing fiber-reinforced plastic moldings (DE4236662C2, DE102009056653A1). In these known injection molding machines, the melt loaded with fibers is conveyed through a backflow stop configured as a mixing part downstream from the fiber infeed opening. Both the worm shaft and the locking ring of the backflow stop are provided with several mixing elements, which interact with each other. While dosing the melt, the fiber-loaded melt flows through the interacting mixing elements. Known from DE4236662C2 is that the mixing part on the worm shaft and a mixing ring enveloping this mixing part, which simultaneously serves as a locking ring, has open mixing chambers that are arranged in mutually offset peripheral rows and axial rows and separated from each other by an annular gap, wherein the gap-side opening edges of the mixing chambers are convexly rounded with a specific bending radius. Known from DE102009056653A1 is to provide a fiber mixing and comminuting device, in which a sleeve (there referred to as a baffle plate sleeve) also assumes the locking function, and thus serves as a locking ring. The baffle plate sleeve is provided with baffle plate channels, wherein each baffle plate channel has an inlet opening and an outlet opening. Locking discs are arranged on the worm shaft in the area of the baffle plate sleeve, and interact with the baffle plate channels. In the open state of the backflow stop, i.e., when dosing fiber-loaded melt, the locking discs are located between the inlet and outlet openings. This means that the fiber-loaded melt flows through the baffle plate channels, and is then comminuted by the screw flights of the rotating work shaft, with a mixing effect being achieved.

The disadvantage to this prior art is that the fibers are comminuted and shortened to a significant extent in the mixing process. On the other hand, the objective is often to have the longest possible pieces of fiber be present in the plastic molding, which has a positive effect on the mechanical properties of the plastic molding.

The use of highly filled melts results in an increased wear on the known mixing elements. As a consequence, metallic dust gets into the plastic molding, and can introduce weak points into the latter. At the same time, the mixing geometry must be routinely replaced or reworked owing to the wear.

BRIEF SUMMARY OF THE INVENTION

Proceeding from the above, the object of the invention is to indicate an injection molding machine for producing fiber-reinforced plastic moldings, in which less reduction in fiber length takes place by comparison to the aforementioned prior art, and in which less wear is expected while processing highly filled melt on the other hand.

This object is achieved in a generic injection molding machine with the characterizing features of claim 1. Advantageous embodiments and further developments are indicated in the dependent claims.

Because a mixing part that is connected with the screw in a rotationally fixed manner and co-rotates with the latter is provided downstream from the backflow stop and/or upstream from the backflow stop, wherein the mixing part has a cylindrical base body whose outer diameter is smaller than the inner diameter of the cylinder, wherein an annular gap is formed between the base body and inner cylinder wall, wherein several drops or drop-shaped mixing elements distributed over the periphery of the base body are arranged on the surface of the base body facing the inner cylinder wall, and wherein the height selected for the drops over the base body is smaller than the width of the annular gap between the base body and inner cylinder wall, the fibers can be gently conveyed and mixed with the melt. The melt is divided and recombined by means of the streamlined drop shape. Due to the low resistance coefficient of this shape, the force acting on the polymer melt is reduced by up to 95% by comparison to other mixing part geometries. As a result, the reduction in fiber length in the mixing part is significantly decreased, and less wear takes place while processing highly filled melts.

On the one hand in particular, a significant reduction takes place in the so-called fiber breakage caused by the interaction between the fibers with melt-carrying surfaces. On the other hand, a significant reduction takes place in so-called secondary fiber breakage, which involves breakage that results given a drop below the critical bending radius of the fibers during flow turbulences. As a consequence, there are thus higher fiber lengths in the melt, which has a positive effect on the mechanical properties in the fiber-reinforced plastic molding.

Another advantage is that the drop-shaped design of the mixing elements lessens their exposure to mechanical stress, thus resulting in less wear to the mixing part.

The drops can preferably be aligned and arranged on the base body in such a way that the respectively rounded end of a drop lies at the front as viewed in the rotational direction of the mixing part. A top view of a drop reveals a longitudinal axis or allows a longitudinal axis to be recognized or defined, which runs from the pointed end of the drop to the essentially opposing, rounded end of the drop or vice versa. Such a longitudinal axis is here also to be referred to as a longitudinal drop axis. The drops can be arranged on the base body in such a way that the longitudinal drop axis of a drop forms an angle with the longitudinal axis of the screw measuring 45° to 90°. The respective longitudinal axis of a drop is preferably to form an angle of 60° to 85°, in particular of 70° to 73°, with the longitudinal axis of the screw.

It can further be provided that several drops be arranged one after the other on the base body in the longitudinal direction of the mixing part, so that these drops form a row of drops. Several such rows of drops can preferably be arranged one next to the other viewed over the periphery of the base body. It can here also be provided that the drops be arranged offset relative to each other in adjacent rows viewed in the longitudinal direction of the mixing part. The rows can also lie or be arranged at an inclination relative to the longitudinal axis of the screw. This means that the longitudinal axis of one row of drops forms an angle with the longitudinal axis of the screw.

It can likewise be provided that several drops have a varying orientation or alignment relative to each other or be arranged on the base body with a varying position of their longitudinal drop axis relative to each other. Different variants are here conceivable. The effects on the fiber-loaded melt differ as a function of orientation or alignment.

In order to be able to generate a pulsating flow of the melt, the selected orientation of the drop shape can preferably be an angle alternatingly greater or less than 90° relative to the longitudinal screw axis. This means that the respective longitudinal axis alternatingly lies at an angle greater or less than 90° relative to the longitudinal screw axis.

It can further be provided that drops with an opposing alignment be arranged on the base body. This means that there are drops whose rounded end lies at the front as viewed in the rotational direction of the mixing part on the one hand, and that there are drops whose pointed end lies at the front as viewed in the rotational direction of the mixing part. As a consequence, fiber bundles that have potentially remained nearly endless, i.e., nearly un-shortened, are shortened by the oppositely oriented drops to a length at which the remaining drops can exert their homogenizing effect. If the fiber bundles were to be conveyed un-shortened through the mixing part into the plastic molding, weak points and local fluctuations in fiber concentration could arise in the plastic molding. Instead of oppositely aligned drops, forms of mixing elements can be provided that allow fiber bundles to be shortened. These could preferably be diamond-shaped mixing elements, wherein the longitudinal axis of a diamond-shaped mixing element is aligned in such a way that there is a front and rear tip viewed in the rotational direction of the mixing part.

In order to prevent the fiber-loaded melt from being subjected to a mixing and comminution of the fibers in the backflow stop as opposed to the prior art mentioned at the outset, the worm shaft can preferably have a smooth surface in the area of the backflow stop.

The backflow stop can especially preferably be designed as an annular backflow stop, and have an essentially sleeve-shaped locking ring, which has a smooth surface on its interior side.

If need be, however, the backflow stop can also have shearing edges instead of smooth surfaces, wherein either the shaft and/or locking ring can be configured with suitable shearing edges. From a technical standpoint, the underlying idea is that endless fibers cannot be mixed in as well as long fibers. Under certain conditions, pre-comminuting endless fibers in the backflow stop can thus be advantageous, so that the ensuing inventive mixed part can have an optimal effect.

In order to be able to achieve a good mixing effect, the height of the drops on the upper side of the base body can preferably be selected in such a way that the upper side of the drops is spaced only slightly apart from the inner cylinder wall. This distance can lie within a range of 0.1% to 1% of the inner cylinder diameter, preferably within a range of 0.2% to 0.5% of the inner cylinder diameter. However, the height of the drops over the base body can also be set as a function of the annular gap between the base body and inner cylinder wall. Expressed differently, this means that the drops extend proceeding from the base body in the radial direction away from the base body, and in so doing correspondingly protrude into the annular gap by a specific percentage.

BRIEF DESCRIPTION OF THE DRAWINGS

The invention will now be described in greater detail below based on exemplary embodiments and drawing reference to FIGS. 1 to 8. Shown on.

DESCRIPTION OF EXAMPLE EMBODIMENTS

Figure 1:
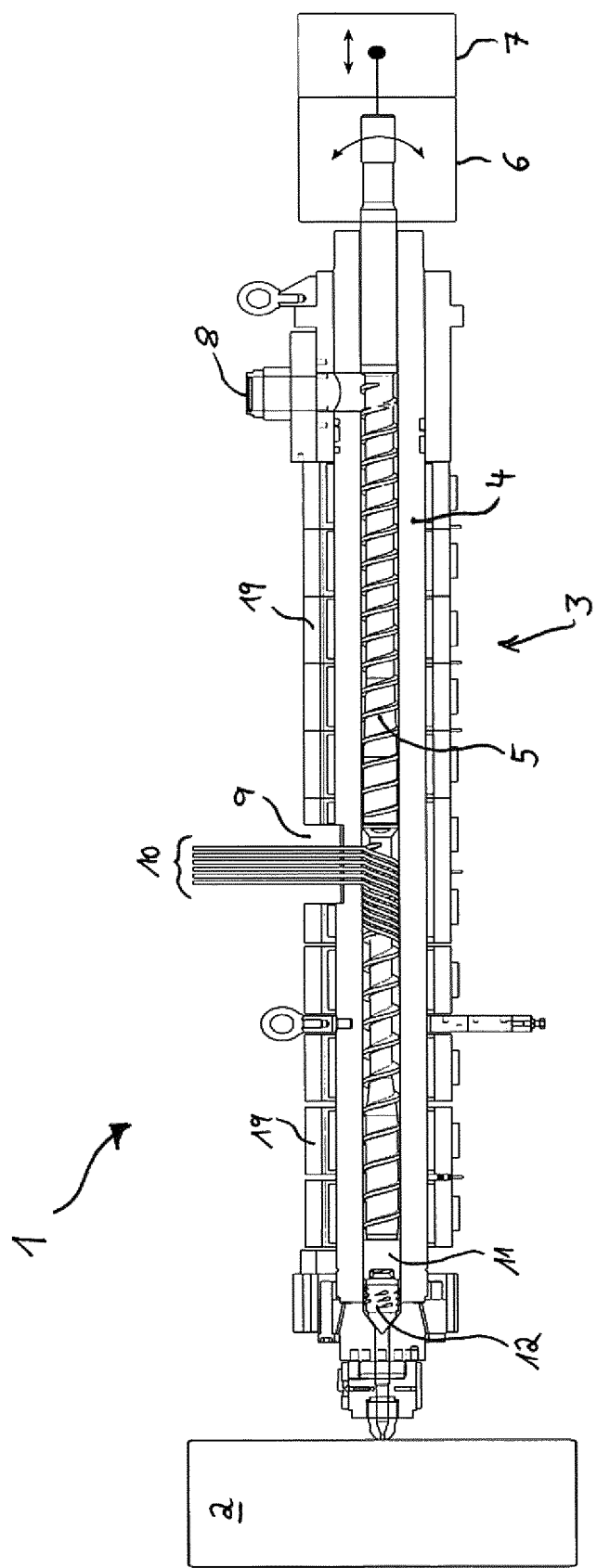
FIG. 1 is an injection molding machine according to the invention.
Figure 8:
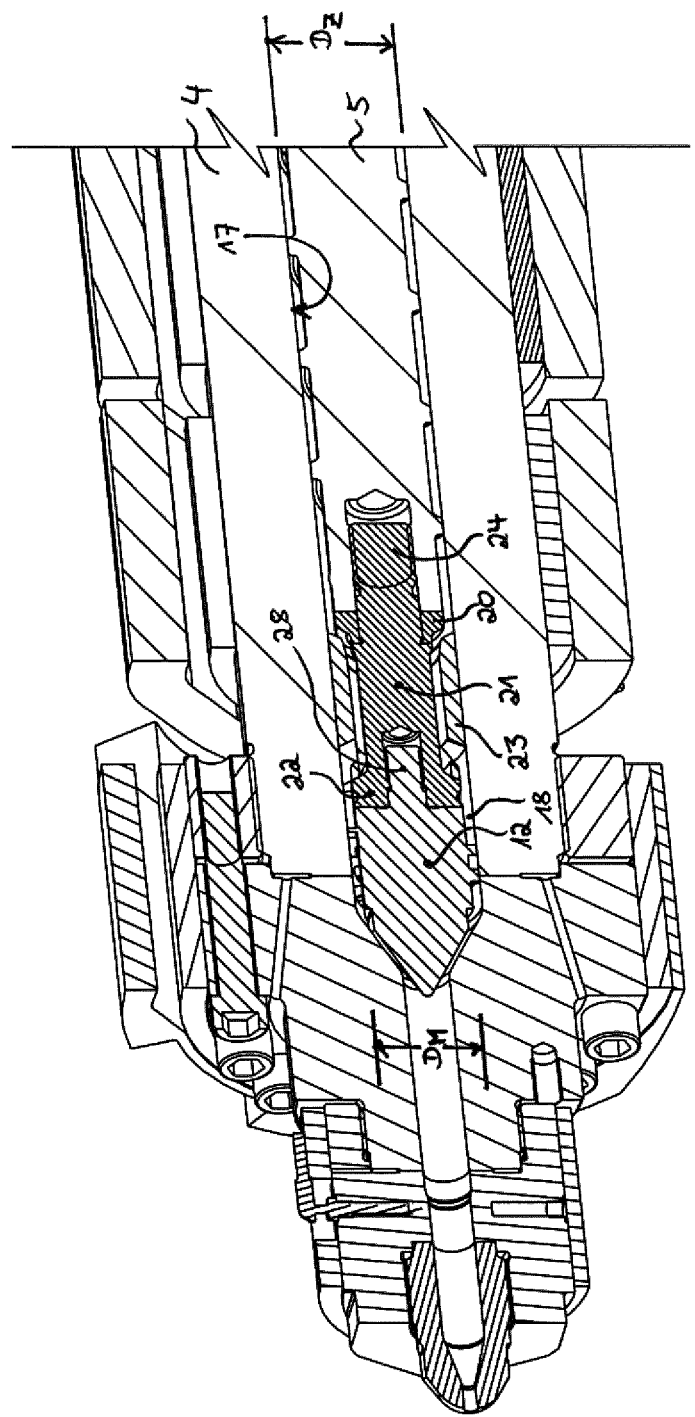
FIG. 8 is a magnified view of the front end section of the screw with a correspondingly magnified view of the backflow stop and mixing part.

The injection molding machine 1 depicted on FIG. 1 essentially comprises a closing unit 2 only denoted schematically here along with an injection unit 3. The closing unit 1 and injection unit 3 are secured to a machine bed (not shown here) in a known manner. The spray unit 3 has a cylinder 4 with a screw 5. Several heating elements 19 are secured to the exterior side of the cylinder 4. The rear end of the screw 5 is operatively connected with a rotary drive 6 and a linear drive 7. Provided in the rear end area of the screw flights is a first opening as the filling opening 8 for feeding in a plastic material to be melted. Provided downstream from the first opening 8 in the cylinder 4 is a second opening as a filling opening 9 for feeding in a fiber material 10. The screw 5 has a backflow stop 11 at the front end. Provided downstream from the backflow stop 11 is a mixing part 12 that is connected with the screw 5 in a rotationally fixed manner and co-rotates with the latter. FIG. 8 presents a magnified view of the front end section of the screw 5 with a correspondingly magnified view of the backflow stop 11 and mixing part 12.

With reference to FIGS. 2A to 7B and in conjunction with FIG. 8, various embodiments of the mixing parts according to the invention are to be described in greater detail.

Figure 2A:
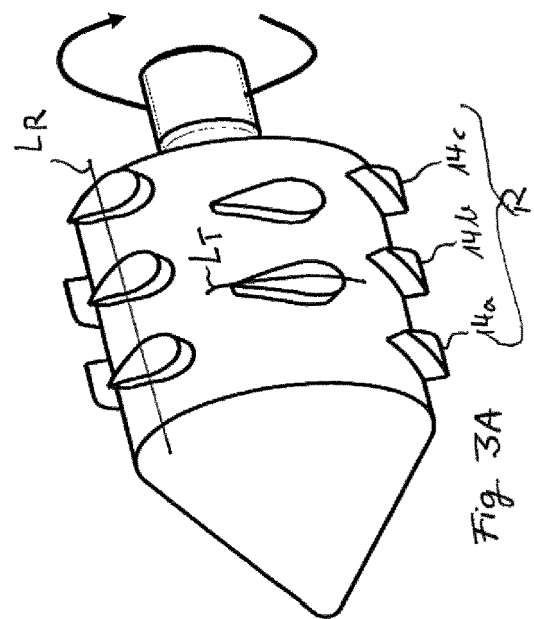
FIG. 2A is a perspective view of a first embodiment of a mixing part according to the invention.
Figure 2B:
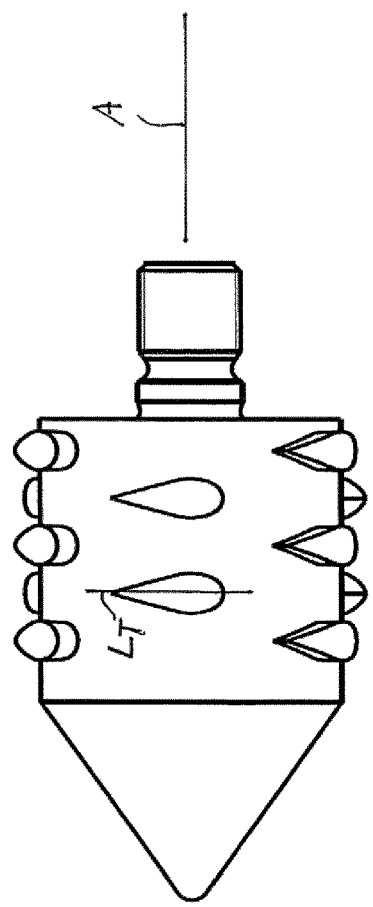
FIG. 2B is a side view of a first embodiment of a mixing part according to the invention.

As evident from FIGS. 2A and 2B as well as FIG. 8, the mixing part 12 has a cylindrical base body 13, whose outer diameter $D_M$ is smaller than the inner diameter $D_Z$ of the cylinder 4, wherein an annular gap 18 is formed between the base body 13 and inner cylinder wall 17. Several drop-shaped mixing elements (drops) are arranged on the surface of the base body 13 facing the inner cylinder wall 17, distributed over the periphery of the base body 13. The selected height H of the drop-shaped mixing elements 14 over the base body 13 is smaller than the annular gap 18 between the base body 13 and inner cylinder wall 17. The drops 14 are here arranged on the base body aligned in such a way that the respectively rounded end 15 of a drop lies at the front viewed in the rotational direction of the mixing part, and the opposing pointed end 16 at the back. A longitudinal axis $L_T$ can be set when viewing a drop 14 from above, which runs from the pointed end 16 of the drop to the essentially opposing, rounded end 15 of the drop or vice versa. The drops 14 are arranged on the base body 13 in such a way that the respective longitudinal axis $L_T$ of a drop 14 forms an angle of 45° to 90° with the longitudinal axis A of the screw. The angles preferably range from 60° to 85°, and especially preferably from 70° to 73°. FIGS. 2A and 2B show an embodiment in which the angle is somewhat smaller than 90°, while FIGS. 3A and 3B show an embodiment with an angle of 90°.

As a rule, several drops 14 are arranged one after the other on the base body viewed in the longitudinal direction of the mixing part 12. This forms a row R of drops 14. Let the row R with drops 14a, 14b and 14c on FIG. 3A be mentioned as an example. Several such rows R of drops are usually arranged one next to the other viewed over the periphery of the base body, as illustrated in the exemplary embodiments depicted here.

Figure 3A:
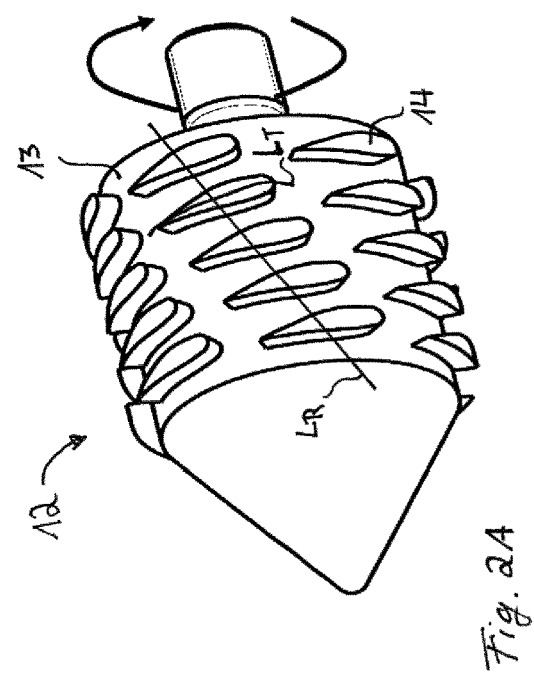
FIG. 3A is a perspective view of a second embodiment of a mixing part according to the invention.
Figure 3B:
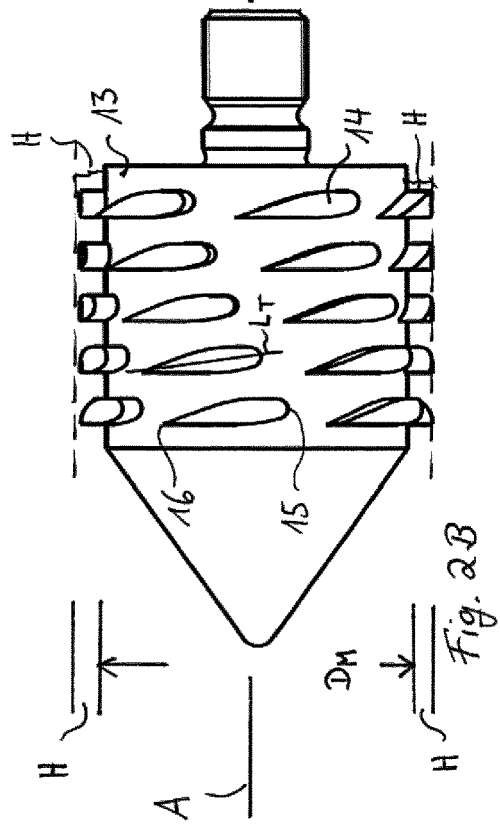
FIG. 3B is a side view of a second embodiment of a mixing part according to the invention.

The drops in adjacent rows can be arranged offset relative to each other viewed in the longitudinal direction of the mixing part, as shown on FIGS. 3A and 3B. It is further possible that the longitudinal axis LR of the rows of drops form an angle with the longitudinal axis A of the screw, as the case on FIGS. 2A and 2B.

Figure 4A:
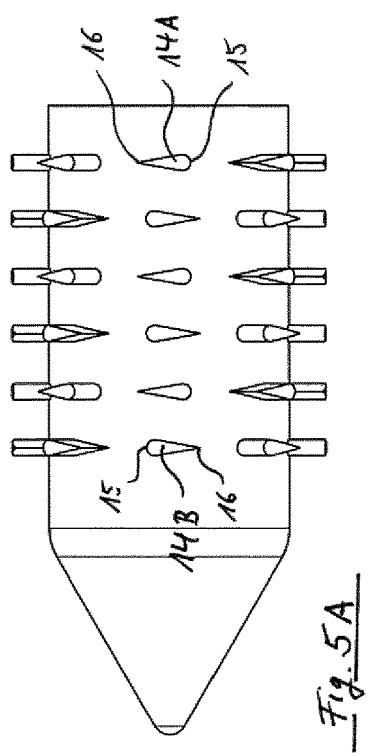
FIG. 4A is a perspective view of a third embodiment of a mixing part according to the invention (oriented according to preferred angle)
Figure 4B:
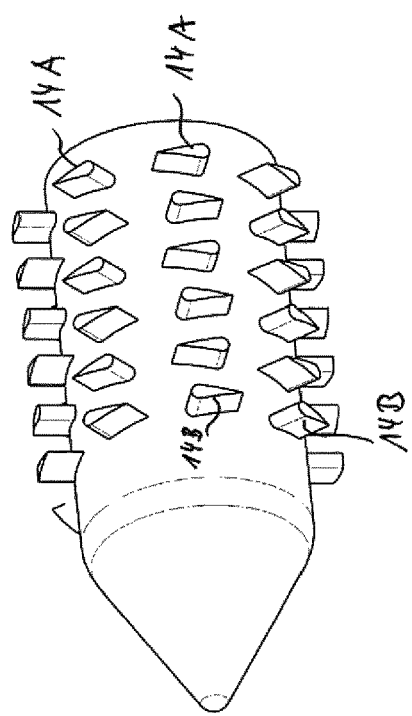
FIG. 4B is a side view of a third embodiment of a mixing part according to the invention (oriented according to preferred angle)

FIGS. 4A and 4B show an embodiment with an angle in an especially preferred range, here of 71.5°. This means that the longitudinal axis $L_T$ of the drops 14 includes an angle with the longitudinal axis A of the screw of α=71.5°.

Figure 5A:
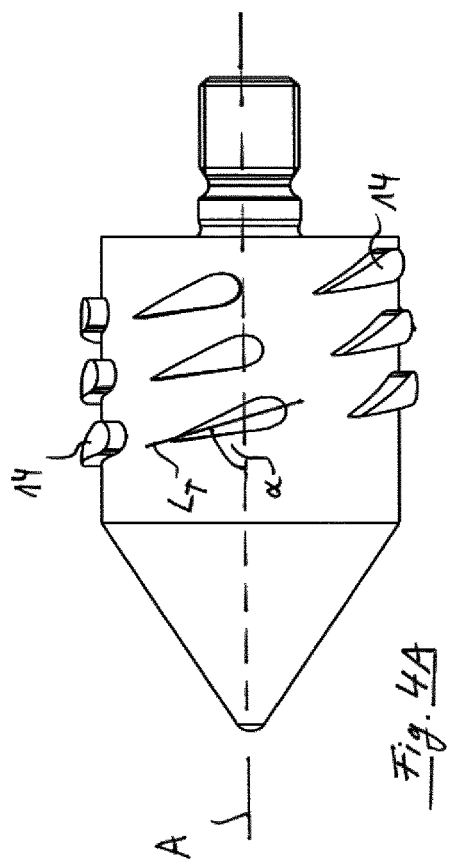
FIG. 5A is a perspective view of a fourth embodiment of a mixing part according to the invention (varying drop orientation—first variant)
Figure 5B:
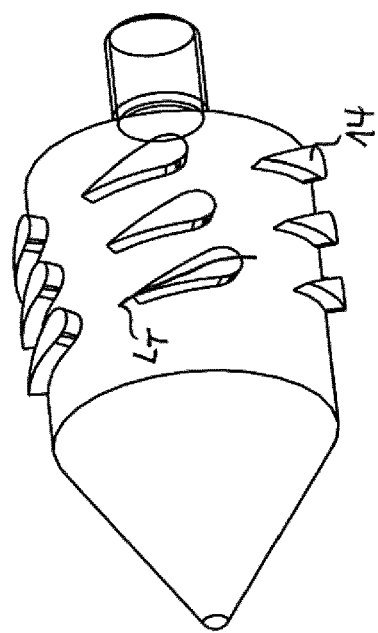
FIG. 5B is a side view of a fourth embodiment of a mixing part according to the invention (varying drop orientation—first variant)

FIGS. 5A and 5B show an embodiment with a varying orientation for the drops. There is a first group of drops with reference number 14A, which are aligned as in the exemplary embodiments described above. This means that the respective rounded end 15 of a drop 14A lies at the front viewed in the rotational direction of the mixing part, and the opposing pointed end 16 at the back. Viewed in the peripheral direction, several drops 14A lie one after the other on a line, and together form a circle of drops 14A. In addition, there is a second group of drops with reference number 14B, which are aligned opposite to the drops 14B. This means that the respective pointed end 16 of a drop 14B lies at the front viewed in the rotational direction of the mixing part, and the opposing rounded end 15 at the back. Viewed in the peripheral direction, several drops 14B lie one after the other on a line, and together form a circle of drops 14B. As the result of such an arrangement of drops 14A and 14B, any fiber bundles that have remained nearly endless, i.e., nearly un-shortened, are shortened by the oppositely oriented drops 14B to a length at which the remaining drops 14A can exert their homogenizing effect. If the fiber bundles were to be conveyed un-shortened through the mixing part into the plastic molding, weak points and local fluctuations of the fiber concentration would arise in the plastic molding. In the present example, circles with drops 14A and circles with drops 14B alternate. If need be, however, a sequence of circles and/or arrangement of drops 14A and 14B other than that that from FIGS. 5A and 5B can be selected.

Figure 6A:
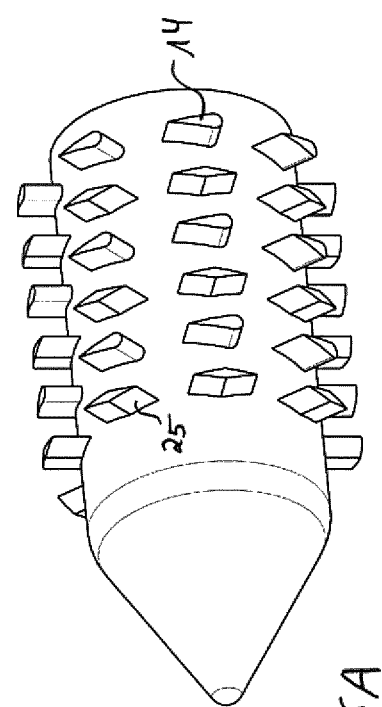
FIG. 6A is a perspective view of a fifth embodiment of a mixing part according to the invention (alternating drop shape with other mixing geometries)
Figure 6B:
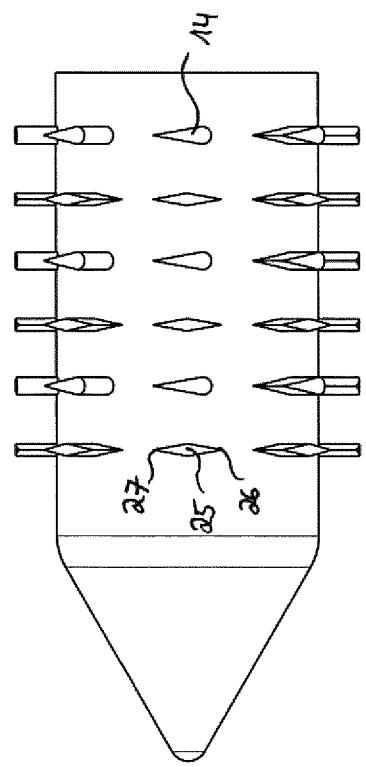
FIG. 6B is a side view of a fifth embodiment of a mixing part according to the invention (alternating drop shape with other mixing geometries)

FIGS. 6A and 6B show an embodiment in which the drop-shaped mixing elements 14 are alternatingly arranged with another form of mixing elements. On FIGS. 6A and 6B, diamond-shaped mixing elements 25 are depicted as the preferred embodiment of this other form of mixing element or mixing geometry. The diamond-shaped mixing elements 25 are arranged in such a way that there is a front tip 26 and rear tip 27 viewed in the rotational direction of the mixing part. The effect is comparable to the embodiment mentioned on FIGS. 5A and 5B. This means that the embodiment according to FIGS. 6A and 6B can also be used to shorten fiber bundles via the front tips 26. The advantage to the embodiment according to FIGS. 6A and 6B is that it can be produced at a lower cost than the embodiment according to FIGS. 5A and 5B. In terms of FIGS. 6A and 6B, what was said on FIGS. 5A and 5B applies with respect to the sequence of circles with drops 14 and diamonds 25, as well as to the arrangement of drops 14 and diamonds 25 on a circle taken in and of itself. If need be, a sequence of circles and/or an arrangement of mixing elements on a circle other than that from FIGS. 6A and 6B can thus be selected.

Figure 7A:
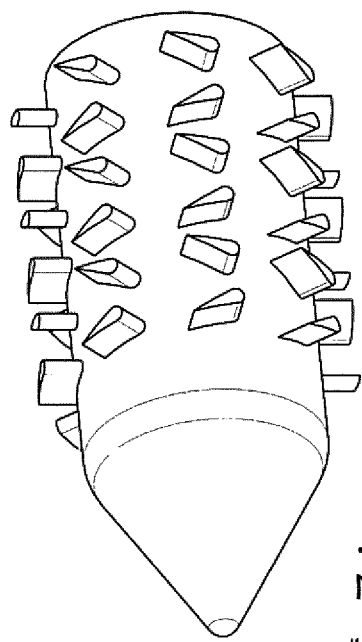
FIG. 7A is a perspective view of a sixth embodiment of a mixing part according to the invention (varying drop orientation—second variant)
Figure 7B:
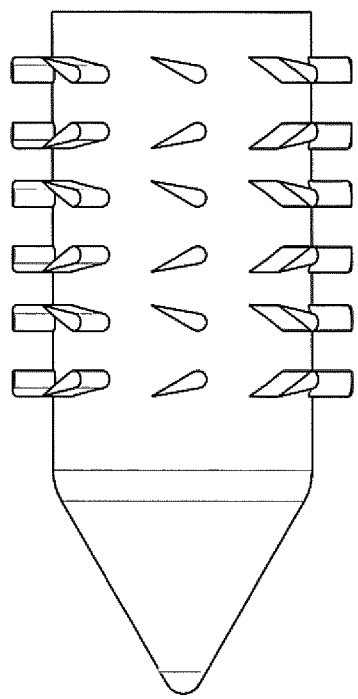
FIG. 7B is a side view of a sixth embodiment of a mixing part according to the invention (varying drop orientation—second variant)

FIGS. 7A and 7B show an embodiment in which the selected orientation of the drop shape is alternatingly greater or less than 90° relative to the longitudinal screw axis A. This means that the respective longitudinal axis $L_T$ alternatingly lies at an angle greater or less than 90° relative to the longitudinal screw axis A. A pulsating flow can be achieved with such an arrangement. As a result, the pulsating fiber-loaded melt runs through various pressure levels, and the fiber cluster that might have remained behind due to the resultantly generated extensional flow can be gently dissolved.

As initially evident from FIG. 8, the backflow stop 11 is designed as an annular backflow stop. The latter comprises the following components (viewed from back to front): pressure ring 20, shaft 21, head 22 and locking ring 23. Provided for attachment in the worm shaft is a thread 24, which can be screwed into a matching thread of the worm shaft or screw 5. As opposed to the prior art mentioned at the outset (DE4236662C2, DE102009056653A1), both the worm shaft in the area of the back flow stop 11, i.e., the shaft 21 of the backflow stop, and the interior side of the locking ring 23 have a respective smooth surface. The mixing part 12 is connected with the screw 5 in a rotationally fixed manner downstream from the backflow stop. In the present exemplary embodiment, the mixing part is fastened by means of a pin 28 in a matching recess in the head 22 of the backflow stop 11.

Further evident from FIG. 8 is how the mixing part 12 is designed relative to the inner cylinder wall 17. The mixing part 12 has a cylindrical base body 13 (see FIG. 2B), whose outer diameter $D_M$ is smaller than the inner diameter $D_Z$ of the cylinder 4, wherein an annular gap 18 is formed between the base body and inner cylinder wall 17. As evident from FIGS. 2A to 7B, several drop-shaped mixing elements or drops 14 are arranged on the surface of the base body 13 facing the inner cylinder wall 17, distributed over the periphery of the base body 13. The selected height H of the drop-shaped mixing elements 14 over the base body 13 is smaller than the annular gap 18 between the base body 13 and inner cylinder wall 17.

The height H of the drops 14 on the upper side of the base body 13 should preferably be selected in such a way that the upper side of the drops is spaced only slightly apart from the inner cylinder wall 17. This distance can lie within a range of 0.02 to 2 mm, preferably within a range of 0.1 to 0.5 mm. However, the height of the drops 14 over the base body 13 can also be set as a function of the size of the annular gap 18 between the base body and inner cylinder wall. The height of the drops 14 over the base body 13 should preferably measure 96% of the width B of the annular gap 18. Expressed differently, this means that the drops 14 extend proceeding from the base body 13 in the radial direction away from the base body, and in so doing correspondingly protrude into the annular gap 18 by a specific percentage.

The mixing part is arranged downstream from the backflow stop in the present exemplary embodiment. However, the mixing part can also be arranged upstream from the backflow stop. An inventive mixing part can possibly also be arranged on either side of the backflow stop. The same or different mixing parts can here be used.

Additional details about the injection molding machine itself are known to the expert, and thus need not be described in any more detail at this juncture.

REFERENCE LIST

| | |
|---|---|
| 1 | Injection molding machine |
| 2 | Closing unit |
| 3 | Injection unit |
| 4 | Cylinder |
| 5 | Screw |
| 6 | Rotary drive |
| 7 | Linear drive |
| 8 | First filling opening-plastic material |
| 9 | Second filling opening-fiber material |
| 10 | Fibers |
| 11 | Backflow stop |
| 12 | Mixing part |
| 13 | Base body |
| 14 | Drop |
| 14A | Drop aligned in the rotational direction of the mixing part |
| 14B | Drop aligned opposite the rotational direction of the mixing part |
| 15 | Front, round end of a drop |
| 16 | Rear, pointed end of a drop |
| 17 | Inner cylinder wall |
| 18 | Annular gap |
| 19 | Heating element |
| 20 | Pressure ring |
| 21 | Shaft |
| 22 | Head |
| 23 | Locking ring |
| 24 | Thread |
| 25 | Diamond-shaped mixing element |
| 26 | Front tip |
| 27 | Rear tip |
| 28 | Pin |
| A | Longitudinal axis of screw |
| $D_M$ | Outer diameter of the base body |
| $D_Z$ | Inner diameter of the cylinder |
| H | Height of a drop over the base body |
| $L_T$ | Longitudinal axis of drop |
| $L_R$ | Longitudinal axis of row |
| R | Row of drops in the longitudinal direction of the mixing part |

What is claimed is:

1. An injection molding machine (1) for producing fiber-reinforced plastic moldings, comprising:
   a closing unit (2);
   an injection unit (3) having a cylinder (4) and a screw (5) that can rotate in the cylinder (4) and be displaced in a longitudinal direction of the cylinder (4), wherein a first opening (8) is provided in the cylinder (4) as a filling opening for feeding in a plastic material to be melted, a second opening (9) is provided in the cylinder (4) downstream from the first opening (8) as a filling opening for feeding in a fiber material, and the screw (5) has a backflow stop (11); and
   a mixing part (12) that is connected with the screw (5) in a rotationally fixed manner and co-rotates with the latter, the mixing part (12) being provided downstream from the backflow stop (11) and/or upstream from the backflow stop (11),
   wherein the mixing part (12) has a cylindrical base body (13) with an outer diameter ($D_M$) that is smaller than an inner diameter ($D_z$) of the cylinder (4), and an annular gap (18) is formed between the base body (13) and an inner cylinder wall (17) of the cylinder (4),
   wherein a plurality of drops (14) as drop-shaped mixing elements (14) are distributed over a periphery of the base body (13) and arranged on a surface of the base body (13) that faces the inner cylinder wall (17), wherein a top view of each drop (14) reveals a longitudinal drop axis ($L_T$), which runs from a pointed end (16) of the drop (14) to an opposing, rounded end (15) of the drop (14), and
   wherein a height (H) of each drop (14) over the base body (13) is smaller than a width (B) of the annular gap (18) between the base body (13) and inner cylinder wall (17).

2. The injection molding machine according to claim 1, wherein the drops (14) are arranged on the base body (13) and aligned in such a way that the rounded end (15) of each drop (14) lies at the front when viewed in a rotational direction of the mixing part (12).

3. The injection molding machine according to claim 1, wherein the longitudinal drop axis ($L_T$) of each drop (14) forms an angle α of 45° to 90° with a longitudinal axis (A) of the screw (5).

4. The injection molding machine according to claim 3, wherein the longitudinal drop axis ($L_T$) of each drop (14) forms an angle α of 60° to 85° with the longitudinal axis (A) of the screw (5).

5. The injection molding machine according to claim 1, wherein the drops (14) are arranged to form several rows (R) of drops (14) each row (R) being arranged next to another when viewed over the periphery of the base body (13).

6. The injection molding machine according to claim 5, wherein the drops (14) in adjacent rows (R) are arranged offset relative to each other when viewed in a longitudinal direction of the mixing part (12).

7. The injection molding machine according to claim 5, wherein a longitudinal axis ($L_R$) of each row (R) of drops (14) forms an angle with a longitudinal axis (A) of the screw (5).

8. The injection molding machine according to claim 1, wherein at least a proportion of the drops (14) vary in orientation relative to each other, or are arranged on the base body (13) such that their longitudinal drop axes ($L_T$) vary relative to each other.

9. The injection molding machine according to claim 8, wherein the orientations of the drops (14) alternate relative to the longitudinal axis (A), such that the longitudinal axes ($L_T$) of the drops (14) alternatingly lie at an angle greater than 90° and an angle less than 90° relative to the longitudinal axis (A).

10. The injection molding machine according to claim 1, wherein at least a proportion of the drops (14) are arranged on the base body (13) with an opposing alignment, such that the rounded end (15) of some drops (14) lies at the front as viewed in a rotational direction of the mixing part (12), and the pointed end (16) of other drops (14) lies at the front as viewed in the rotational direction of the mixing part (12).

11. The injection molding machine according to claim 8, wherein the work shaft has a smooth surface in the area of the backflow stop (11), or that the shaft (21) of the backflow stop (11) has a smooth surface.

12. The injection molding machine according to claim 8, wherein:
the backflow stop (11) is designed as an annular backflow stop and has a sleeve-shaped locking ring (23), and
the locking ring (23) has a smooth surface on its interior side.

13. The injection molding machine according to claim 8, wherein the height (H) of each drop (14) is selected in such a way that an upper side of each drop (14) is spaced slightly apart from the inner cylindrical wall (17), wherein a distance between the upper side of each drop (14) and the inner cylinder wall (17) lies in a range of 0.02 to 2 mm.

14. The injection molding machine according to claim 13, wherein the height (H) of each drop (14) measures 80%-99% of the width (B) of the annular gap (18) between the base body (13) and inner cylinder wall (17).

15. The injection molding machine according to claim 13, wherein, in addition to the drop-shaped mixing elements (14), diamond-shaped mixing elements (25) are provided, wherein the drop-shaped mixing elements (14) and diamond-shaped mixing elements are alternatingly provided when viewed in a longitudinal direction of the mixing part (12).

16. The injection molding machine according to claim 4, wherein the longitudinal axis ($L_T$) of each drop (14) forms an angle α of 70° to 73° with the longitudinal axis (A) of the screw (5).

17. The injection molding machine according to claim 13, wherein the distance between the upper side of each drop (14) and the inner cylinder wall (17) lies in a range of 0.1 to 0.5 mm.

18. The injection molding machine according to claim 1, wherein the backflow stop (11) and mixing part (12) are downstream from the second opening (9).

19. The injection molding machine according to claim 1, wherein the mixing part (12) is downstream from the backflow stop (11).

* * * * *